May 5, 1942.  A. W. PLENSLER  2,282,288
GEAR CUTTING APPARATUS
Filed March 8, 1939   2 Sheets-Sheet 1

Inventor:
Alexander W. Plensler.
By: Foorman L. Mueller,
Atty.

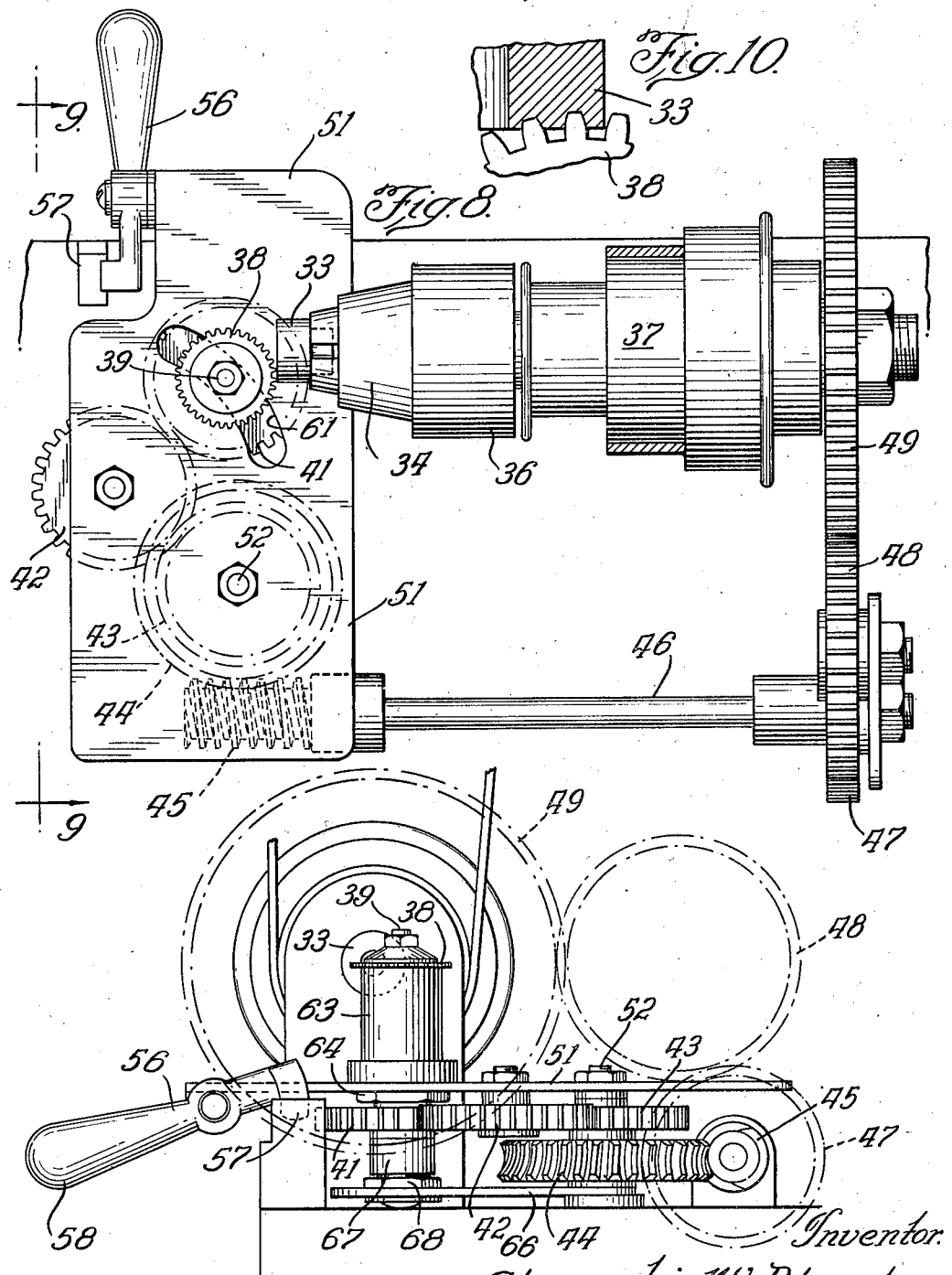

Patented May 5, 1942

2,282,288

UNITED STATES PATENT OFFICE 2,282,288

GEAR CUTTING APPARATUS

Alexander W. Plensler, Chicago, Ill., assignor to Belmont Radio Corporation, a corporation of Illinois Application March 8, 1939, Serial No. 260,597

4 Claims. (Cl. 90—4)

This invention relates to apparatus for cutting worms and in particular to an improved apparatus for cutting a spiral worm. The worm may conveniently be called a spiral worm although in some forms it might not be a true spiral. The term "spiral" is used because the threads are spirally arranged on an end face of the worm instead of being helically arranged along the side of the worm as in a conventional structure.

A spiral worm having the threads on the end of the worm has several advantages. One of the most important is that it may very easily be arranged to serve as a clutch as well as a worm purely by mounting it so that it may be shifted in an axial direction away from the spur gear with which it is in engagement. Because the spiral worm has its worm threads approximately in one plane, it makes little or no difference whether or not the worm axis is slightly removed from the plane of the spur gear. In order for an ordinary worm gear to be separated from a spur gear it is necessary for it to be moved in a direction perpendicular to its axis. Of course, it is much more difficult to provide a mounting which will permit a conventional worm to move perpendicularly to its axis, requiring transverse movement of the shaft, than to mount the spiral worm so that it may be moved in an axial direction, requiring merely the longitudinal movement of the worm on the shaft or the longitudinal movement of the shaft and worm together. It is a general object of this invention, therefore, to provide an improved apparatus for efficiently and economically making spiral worms of the above-mentioned type.

Additional advantages and objects of this invention will be apparent from the following description and from the drawings, in which:

Fig. 8 is a plan view illustrating a preferred method of making the worms shown in Figs. 3 and 7.

Fig. 9 is a view taken approximately on the line 9—9 of Fig. 8.

Fig. 10 is a fragmentary view of a cutter gear and blank showing the position of the two members in an early stage of the cutting operation.

In the apparatus as illustrated the blank for the spiral worm is placed in a revolving chuck as in a lathe, and a cutter having the same shape as the spur gear with which the worm is to engage is urged against the face of the blank, the cutter being rotated at a speed which will give the worm threads the desired shape and lead. By merely changing the relative speed of rotation of the cutter and the blank, spirals may be provided having optionally one, two, or more leads, so that upon each revolution they will rotate the spur gear engaging therewith an angle corresponding to one, two or more teeth respectively.

Figure 1:
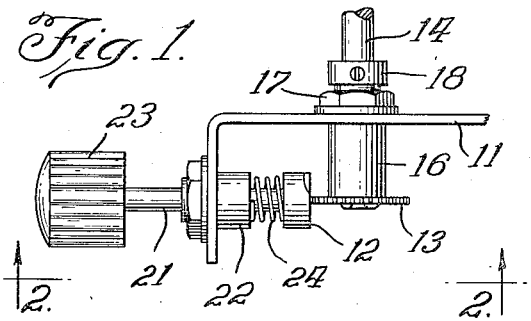
Fig. 1 is a side view of a gearing unit embodying one form of this invention chosen for illustration.

Referring to Figs. 1 to 4 of the drawings, one form of spiral worm made by the improved apparatus of this invention is illustrated for example, in connection with a gearing unit used in radio receiving sets. In Fig. 1 the gearing assembly is supported by a frame member 11 and includes a spiral gear 12 and a spur gear 13. The gear 13 is fixed on a shaft 14 which is journaled in a bearing bushing 16 which may be rigidly secured to the frame 11 as by a nut 17. A retaining collar 18 may restrain the shaft 14 against longitudinal movement.

The spiral worm 12 is fixed on a shaft 21 which is suitably journaled in a bearing bushing 22 which may be secured to the frame 11 in the same manner as is the bearing 16. The shaft 21 may be provided with a handle 23 or other means for causing a rotation of the shaft 21, and a spring 24 may be provided between the worm 12 and the bearing 22 to urge the worm 12 into mesh with the spur gear 13. It might seem from Figs. 2 and 4 that with this general type of spiral worm, it would be necessary for the spiral to engage the spur gear 13 very close to the point of tangency between the spur gear 13 and a plane perpendicular to the shaft 21. However, should it be necessary to design the gearing so that the shaft 21 was considerably removed from this point of tangency, this could be accomplished in the manner seen in Fig. 5 by shaping a worm 32 with a step-like formation as seen best in cross-section in that figure.

Figure 3:
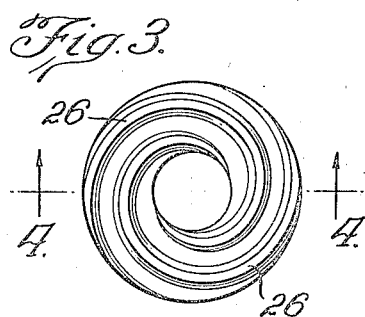
Fig. 3 is a face view of the spiral worm shown in Figs. 1 and 2.
Figure 2:
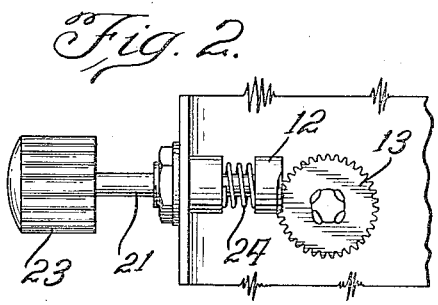
Fig. 2 is a view of the structure shown in Fig. 1, taken approximately on the line 2—2 of Fig. 1.
Figure 4:
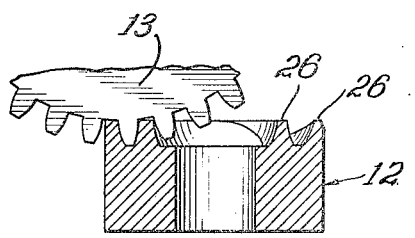
Fig. 4 is a sectional view taken on the line 4—4 of Fig. 3 and showing the spur gear meshing with the spiral worm of these figures.
Figure 5:
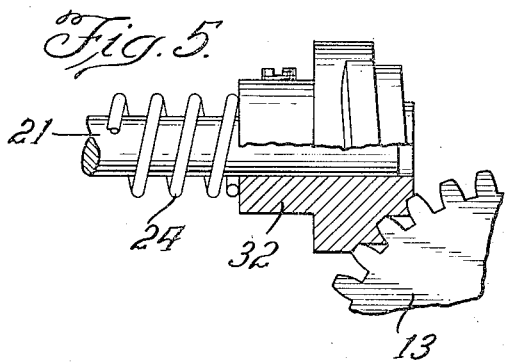
Figs. 5 and 6 are fragmentary views showing modified forms of the invention.
Figure 7:
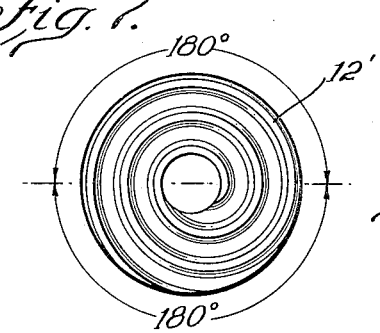
Fig. 7 is a view corresponding to Fig. 3 but showing a worm having one lead instead of the two leads of Fig. 3. The worm also is designed for intermittent drive instead of continuous drive.

As seen in Fig. 3, the worm 12 has formed on its end face one or more worm threads 26 extending spirally of the face. Their engagement with the teeth of spur gear 13 is best seen in Fig. 4. The number of worm threads, or, in other words, the number of leads, provided determines the gear ratio. Thus, with the two-lead worm shown in Fig. 3 the spur gear 13 will be rotated the distance of two teeth for each revolution of the worm 12. With a single-lead worm such as is shown in Fig. 7 the gear 13 would be rotated only the space of one tooth for each revolution of the worm 12'. Worms may also be provided with three or four, or even more, leads. Likewise, as shown in Fig. 7, the worm may be provided with irregularly shaped threads so that the movement of the spur gear 13 will be intermittent or varied. Thus, in Fig. 7 the upper half of the thread is concentric with the axis of the worm 12' while the lower half of the thread is spirally shaped, with a spiral approximately the same as that in Fig. 3. During 180° of the revolution of the worm 12', corresponding to the upper half of the worm as shown in Fig. 7, the spur gear 13 would not move at all, while during the other 180° it would move the distance of one tooth. The various spirals shown in these figures are manufactured very economically by the improved apparatus illustrated in Figs. 8 and 9, which apparatus may also be utilized in forming worms of substantially conventional type. The blank on which the spiral is to be formed is mounted on a lathe spindle 34. Although the driving of the lathe spindle 34 is not a part of this invention, it may be explained for clarity that the spindle may be mounted in a fixed journal 36 and driven by a belt extending over a pulley 37. The worm threads are cut in the blank 33 by a gear-shaped cutter 38 which is rigidly mounted on a driven shaft 39, the shaft 39 being driven at a speed proportional to the speed of the blank 33 so that for every revolution of the blank 33 the gear cutter 38 will move the space of one or more teeth depending on the number of leads desired on the finished worm. The shape of gear cutter 38 is of course based on the shape of spur gear 13 with which the worm is to be used. The important considerations are that it have the same pitch (teeth per inch along a concentric line passing midway through the teeth) and that each tooth be shaped to give the clearance necessary in view of the thickness of the spur gear to be used. The teeth of cutter 38 are preferably tapered so that they engage the blank only along their front edges. A 2° taper on the inner side of the tooth (cutting the outside of a worm thread) and a 5° taper on the outer side have been found satisfactory. Of course, cutter 38 will be made of a suitable tool steel instead of the softer metals of which the gears will usually be made.

In the illustrated form the shaft 39 is driven by a train of gears 41, 42 and 43, of which the latter is mounted to rotate with a worm wheel 44 driven by a worm 45 which is carried by a shaft 46 driven by gears 47, 48 and 49, the latter of which is keyed on the shaft of lathe spindle 34. In order to drive the cutter 38 at the proper speed, it is probably most convenient to provide the worm wheel 44 with the same number of teeth as are provided on the cutter 38 and to provide the gears 41 and 43 each with the same number of teeth as the other. It will follow then that for every movement of the worm wheel 44 equal to the space of one tooth thereon the cutter 38 will be given a movement equal to the space of one tooth on this cutter. Accordingly, it will merely be necessary to drive the worm wheel 44 at a rate such that a relative desired speed of rotation is obtained between the cutter 38 and the blank 33. Thus, to cut the two-lead spiral worm shown in Fig. 3, the gears 49 and 47 will bear a two to one ratio and the worm 45 will be a single or a one-lead worm. If the worm 45 is changed to a double or two-lead worm, a four-lead spiral worm will be cut. It is clear, of course, that when the worm 45 is changed that the worm wheel 44 will be correspondingly changed. If the gears 49 and 47 are changed to a one to one ratio and the illustrated worm 45 is used, a one-lead spiral worm will be cut. A three-lead spiral worm can be cut with a double worm in place of the worm 45 and gears having a ratio of three to two in place of the gears 49 and 47. To cut a spiral worm having an interrupted drive as shown in Fig. 7, some type of intermittent drive in the nature of the well known Geneva gear mechanisms may be used.

Gears 41 and 42 together with shaft 39 and gear cutter 38 are carried by a pivoted plate 51 which is pivoted on pivot 52 on which are also pivoted worm wheel 44 and gear 43. The result of this mounting is that the plate 51 may be rotated about the pivot 52 without causing any true rotation of gear cutter 38 about its own axis. In other words, as the plate 51 is rotated, the gear 41 is thereby rotated correspondingly in the reverse direction with respect to the plate 51 so that the net absolute rotation of cutter 38 about its own axis is zero (ignoring, of course, the constant rotation caused by shaft 46).

Fig. 10 shows the cutter in an intermediate stage of the cutting process and makes clear the necessity that each time the blank 33 rotates to the position shown the cutter 38 must have the angular position shown in spite of the fact that it will have cut further into the blank.

The plate 51 may be operated in any convenient manner to urge the gear cutter 38 against and into the blank 33. According to the illustrated form of the invention, a cam lever 56 is provided which is pivoted to the plate 51 and which bears against a lug 57. The dimensions of the cam lever 56 and the lug 57 determine the distance that the plate 51 will be rotated toward the blank 33 and hence the depth to which the gear cutter 38 will cut into the blank 33. When the limit of movement has been reached, the lever 56 may be swung to its natural position with the handle 58 dropping (this handle preferably being heavy) to release the plate 51 so that the blank 33 or rather the finished worm may be removed.

As illustrated in Fig. 8, the apparatus is set for cutting the spiral shown in Figs. 1 to 4, the shaft 39 being positioned within the zone included between the peripheral extensions of the blank 33. On pivotal movement of the plate 51 in a horizontal plane, therefore, the cutter 38 is moved in a direction substantially axially of the blank 33 and into cutting engagement with the face thereof. From Fig. 5 it is obvious that in cutting the worm there shown, the center of the cutter must be outside of the periphery of the worm. To this end, if it is desired to have the apparatus adapted for both types of gears, the shaft 39 should be adjustable. It may be made adjustable in any desired manner as by providing the slot 61 concentric with gear 42 and providing any suitable means for locking the shaft 39 at any desired position in the slot 61. Since the shaft 39 should be very rigidly journaled, it is desirable for it to have a large bearing bushing 63. To make this bearing bushing rigid and at the same time lock the shaft 39 in a desired position, the bushing 63 may have a threaded stud extending through the plate 51 with a nut 64 screwed on said stud. If desired, the shaft 39 may also be braced by a subplate 66 which may be simply pivoted about the pivot 52 or may be rigidly secured to the plate 51 with spacing posts. If the slot 61 is provided in plate 51, a corresponding slot should of course be provided in subplate 66, and in that event a bearing bushing 67 for the lower end of shaft 39 may be secured in its position in the slot by a nut 68 as in the case of bushing 63. Of course, if it is not desired to have the machine adaptable for the worm of Fig. 5, a simple hole may be substituted for the slot 61, and a simple hole in subplate 66 will likewise be sufficient.

In adjusting the machine to cut different worms, it will often be necessary to cause the cutter to cut to different depths. Thus, for the worm in Fig. 5 it is obvious that the cutter must cut much more deeply than for the worm in Fig. 4. To a large extent this will be accomplished automatically by the direction in which the slot 61 extends. Further adjustment, however, may be accomplished by providing an adjustable lug 57 or by substituting a different cam lever 56 for the one shown. Likewise, of course, the cam lever could be of such nature that it would produce greater movement than would ordinarily be desired, with some adjustable stop means either for the cam lever or for the plate 51.

Figure 6:
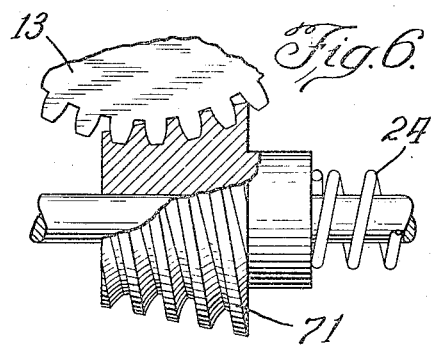

Insofar as the apparatus is concerned, it is not essential that the direction of movement of the cutter be always axial with respect to the blank 33. Fig. 6 shows a modified form of spiral 71 in the cutting of which the movement of the cutter is mainly radial relative to the blank 33. However, because of the pivotal movement of the cutter 38 into the blank 33 the slope of the worm would be characterized by such cutting engagement. The tapered or partly spiral worm of Fig. 6 thus has an advantage over conventional worms in that the spring 24 may urge the worm into close engagement with the spur gear 13. Of course, with both Figs. 5 and 6 the spring 24 must be sufficiently strong to overcome the torque with which the spur gear 13 resists movement. If could of course be entirely radial if preferred, in which case a worm similar to conventional worms would be cut. The tapered or partly spiral worm of Fig. 6 has an advantage over conventional worms in that the spring 24 may urge the worm into close engagement with the spur gear 13. Of course, with both Figs. 5 and 6 the spring 24 must be sufficiently strong to overcome the torque with which the spur gear 13 resists movement.

In the present invention, therefore, I provide a simple, and inexpensive apparatus for manufacturing spiral worms at extremely low cost, and manufacturing such worms in varying configurations.

The disclosures of this application are illustrative and the invention is not to be limited by them. In fact, if modifications or improvements are not at once obvious, they may be devised in the course of time to make additional use of the broad ideas taught and covered by this application. The claims are intended to point out novel features and not to limit the invention except as may be required by prior art.

The term "spur gear" is not intended to exclude worm wheels.

I claim:

1. Apparatus for making gears with spiral leads including means for rotating a blank to be cut into such a gear, a rotary cutter having a succession of fixed teeth extending peripherally thereon and each tooth having a cutting edge on one side thereof, mounting means for said cutter supported on a pivoted plate, a fixed frame member adjacent said pivoted plate, and a handle member pivotally secured to the said pivoted plate for moving said mounting means and the cutter therewith into cutting engagement with said blank, with a cam portion on one of said two members in a position such that the pivotal movement of the handle when said handle member is in operative connection with said frame member in at least one operating position thereof, will cause the cutter to cut progressively deeper into said blank.

2. In apparatus for cutting a spiral in the face of a blank, the combination of means for holding and rotating said blank, a horizontally rotatable cutter arranged in a plane including the axis of said blank, axis means for supporting said cutter, said axis means being at right angles to the axis of said blank, a horizontal frame member for supporting said cutter axis means, means pivotally supporting said frame member so that said cutter is pivotally movable into cutting engagement with said blank face, said frame member having a slot therein for slidably receiving said axis means, with movement of said axis means in said slot serving to vary the position of cutting engagement of said cutter with the blank to in turn vary the length of the spiral which is cut on said blank face.

3. In apparatus for cutting a spiral in the face of a blank, said apparatus being adapted for mounting on a standard lathe having a thread cutting gear arrangement and including means in the head thereof for holding and rotating said blank, the combination of a toothed cutter having a cutting edge on the side of each tooth thereof, axis means at right angles to the axis of the blank for rotatably supporting said cutter, with the plane of said cutter being positioned in a plane including the axis of said blank, a pivoted frame for said cutter axis means, means pivotally supporting said frame so that said cutter is pivotally movable into cutting engagement with said blank face, a gear train for rotating said cutter, the first gear of said train being driven by the lathe driving means, a second gear assembled coaxially with said cutter, and a third gear in operative engagement with said first and second gears, with said second and third gears being rotatably supported on said pivoted frame, said frame having an arcuate slot therein concentric relative to said third gear for slidably receiving said cutter axis means, with movement of said cutter axis means in said slot moving said second gear concentrically relative to said third gear and adjusting the cutting position of said cutter relative to said blank.

4. In apparatus for cutting a spiral on the face of a blank adapted to be removably attachable to mechanism having means for holding and rotating said blank, the combination of a cutter having axis means arranged substantially normal to the axis of the blank and spaced from the blank face in a direction axially of said blank, a frame member for supporting said cutter axis means, gear means in operative connection with said cutter axis means carried by said frame member, means supporting said frame member for pivotal movement on said mechanism so that said cutter is pivotally movable into and out of cutting engagement with the blank face, and means operatively connecting said gear means with said blank rotating means, said frame member having a slot therein for slidably receiving said cutter axis means, with movement of said cutter axis means in said slot serving to vary the position of cutting engagement of said cutter with the blank face to in turn vary the length of the spiral which is cut on the blank face.

ALEXANDER W. PLENSLER.